Sept. 24, 1929.  A. O. AUSTIN  1,728,953
INSULATOR FITTING
Filed March 1, 1923
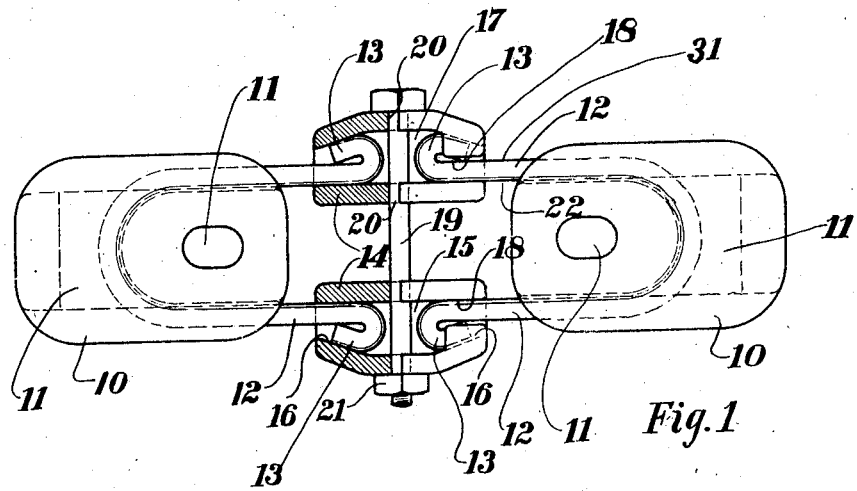
Fig.1
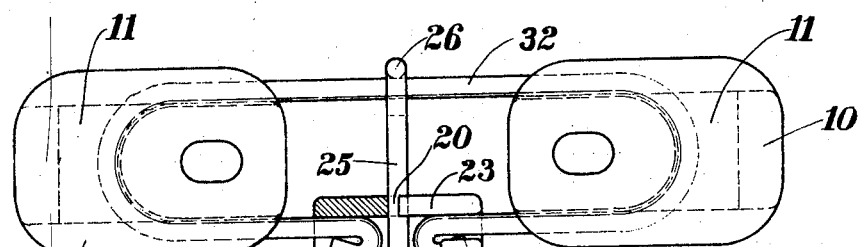
Fig.2
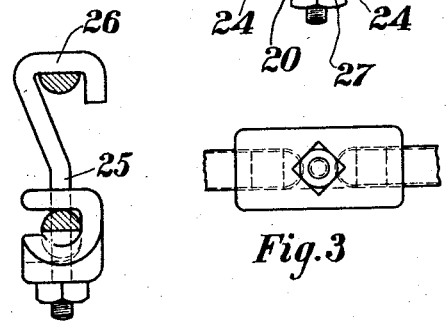
Fig.3
Fig.4
INVENTOR
Arthur O. Austin
BY Nissen & Crane
ATTORNEY Patented Sept. 24, 1929

1,728,953

UNITED STATES PATENT OFFICE

ARTHUR O. AUSTIN, OF BARBERTON, OHIO, ASSIGNOR, BY MESNE ASSIGNMENTS, TO THE OHIO BRASS COMPANY, OF MANSFIELD, OHIO, A CORPORATION OF NEW JERSEY

INSULATOR FITTING

Application filed March 1, 1923. Serial No. 621,972.

This invention relates to the metallic fittings or holding members for electric insulators, and has for its object the provision of devices of the nature specified, which shall be economical to manufacture, convenient to install, and which shall be of improved construction and operation.

The invention is exemplified in the combination and arrangement of parts shown in the accompanying drawings and described in the following specification, and it is more particularly pointed out in the appended claims.

In the drawings:

Fig. 1 is an elevation of a pair of insulators connected by a fitting embodying one form of the present invention.

Fig. 2 is a view similar to Fig. 1, showing a slightly modified form of the invention.

Fig. 3 is a plan view of the link connector shown in Fig. 2.

Fig. 4 is an end view of the same connector.

As illustrated in the drawings, the numeral 10 designates a pair of insulators such as that shown in my Design Patent #56,262, although the fitting may, of course, be used in connection with a large variety of insulators in addition to the form shown.

Insulator 10 is provided with oppositely extending perforations 11, having connector links 12 threaded therethrough, the ends of the links 12 being bent upon themselves as shown at 13 to provide enlarged heads by means of which the links may be connected to supporting members or to corresponding links of a companion insulator in a string. For connecting the links to supports or to one another, socket members 14 are provided, having internal recessses 15 tapered toward the opposite ends of the socket members, as shown at 16. The taper is provided by the angular arrangement of the wall of the recess which engages the bent end of the head 13, while the opposite wall of the recess is straight as shown in the drawing. The side walls of the recess are also straight as shown in the drawing. One side wall of the socket member is provided with an opening 17 for admitting the headed ends of the links 12; slots 18 communicate with the opening 17 and extend to the ends of the socket members to accommodate the portions of the link 12 adjacent the heads 13.

It will be readily apparent that the links are moved side wise thru the opening 17 and then slid in a longitudinal direction until the heads are clamped in the tapered portions of the sockets bringing the heads opposite the slots 18 so that they are held by the walls of the slots against lateral movement from the sockets. When the socket members are in place on the links, a bolt or other fastening device 19 is passed thru openings 20 in the side walls of the socket members and secured by a nut 21, so as to retain the bolt in place and hold the ends of the links inwardly against the sides of the insulators. The portions of the bolt passing thru the socket members provide abutments which prevent backward movement of the heads 13 into registration with the openings 17 so that the heads are locked in the socket members. It will be seen that the inclined walls of the socket members provide abutments which hold the bent ends of the heads 13 from straightening under tension on the links. The force holding the links inwardly will be increased as the load on the insulator increases, so that a firm connection between the insulator links is secured. The links 12 preferably have, in cross section, the shape of a segment of a circle, the rounded portion 22 fitting the lateral grooves in the insulators 10. This cross sectional shape disposes the greater portion of the material of the links where there is the least distortion when the links are bent to form the heads 13. It also provides extended contact where the bent ends engage the flat surfaces of the links 12 so that there is no tendency for these parts to slip past each other. The cross sectional shape also forms, when the link is bent, a globular shaped head that is firm and efficient in its connection with the socket 15. Other sectional shapes, may, however, be used.

In the form of the invention shown in Figs. 2 and 4, the insulators 10 are connected by a single bar 32 threaded at each end thru the openings 11 in the insulator and having a single socket member 23 for connecting the headed ends 24; the hook bolt 25 has a hooked end 26 in engagement with the continuous portion of the bar 22, while the threaded end of the bolt passes thru the openings 20 in the socket member 23 and is provided with a nut 27 for drawing the two sides of the connector link toward one another and holding them firmly against the insulators; the bolt 25 provides a lock for the headed ends 24 in the same manner as that described in connection with Fig. 1.

I claim:

1. In combination a connector link for an insulator comprising a rod having one convex and one substantially flat side, one end of said rod being bent upon itself toward the flat side thereof providing a head, and a socket member having a tapered opening receiving said head.

2. An insulator fitting comprising a U link adapted to be threaded thru an insulator, said link having the end of one leg thereof headed, a socket member having a recess therein and an opening for admitting said headed end to said recess and a connector passing thru said recess to retain said headed end in said socket member and connected with the other leg to limit spreading of the legs of said U link.

3. In combination, a link comprising a rod having one convex side and one flat side, one end of said link being bent upon itself to bring portions of said flat side into contact with each other, thus providing an enlarged end on said link, and a member having a tapered socket for receiving said end, the tapered wall of said socket member tending to force the engaging flat portions of said link against each other.

In testimony whereof I have signed my name to this specification on this 24th day of February, A. D. 1923.

ARTHUR O. AUSTIN.